United States Patent
Ferlitsch

(10) Patent No.: US 7,256,901 B2
(45) Date of Patent: Aug. 14, 2007

(54) PRINTER DRIVER CUSTOMIZATION USING INCREMENTAL CUSTOM PRINT PROCESSOR

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 884 days.

(21) Appl. No.: 10/269,378

(22) Filed: Oct. 10, 2002

(65) Prior Publication Data

US 2004/0070640 A1    Apr. 15, 2004

(51) Int. Cl.
G06F 3/12      (2006.01)
G06F 15/80     (2006.01)
G06F 15/82     (2006.01)
G06F 15/16     (2006.01)

(52) U.S. Cl. .................. 358/1.13; 358/1.15; 358/1.16; 710/14; 710/16; 345/502

(58) Field of Classification Search ...................... None
See application file for complete search history.

(56) References Cited

U.S. PATENT DOCUMENTS

| | | | | |
|---|---|---|---|---|
| 5,222,200 A * | 6/1993 | Callister et al. | ........... | 358/1.13 |
| 5,226,112 A * | 7/1993 | Mensing et al. | ........... | 358/1.15 |
| 5,566,278 A * | 10/1996 | Patel et al. | ................ | 358/1.15 |
| 5,572,631 A * | 11/1996 | Kavathekar et al. | ....... | 358/1.16 |
| 6,092,089 A | 7/2000 | Lahey et al. | | |
| 6,097,496 A * | 8/2000 | Papke et al. | .................. | 358/1.1 |
| 6,266,150 B1 | 7/2001 | Brossman et al. | | |
| 6,327,045 B1 * | 12/2001 | Teng et al. | ................. | 358/1.15 |
| 6,498,657 B1 * | 12/2002 | Kuntz et al. | ............... | 358/1.15 |
| 7,062,402 B2 * | 6/2006 | Ternasky et al. | ............ | 702/123 |
| 7,096,143 B2 * | 8/2006 | Ternasky et al. | ............ | 702/123 |

(Continued)

FOREIGN PATENT DOCUMENTS

JP    2003288191 A  * 10/2003
JP    2004157998 A  *  6/2004

OTHER PUBLICATIONS

Adobe Systems Incorporated, *PostScript Printer Description File Format Specification*, Feb. 9, 1996, pp. 1-240.

Primary Examiner—Twyler Lamb
Assistant Examiner—Myles D. Robinson
(74) Attorney, Agent, or Firm—Marger Johnson & McCollom, P.C.

(57) ABSTRACT

An operating system alternate arrangement for a printer driver/spooler/print processor is disclosed. Referring to one embodiment, although using a PPD-compatible printer driver is often desirable, such a driver includes no mechanism for implementing a printer feature that cannot be specified in a PPD. The disclosed alternate arrangement uses the PPD for those printer options and features that can be specified by PPD. The remaining options and features are classified as "custom actions" that are processed in a custom print processor that is bound to the spooler in place of the operating system's default print processor. Preferably, however, the custom print processor does not implement any traditional print processor functionality. Instead, after performing any custom actions, the custom print processor subroutines call the OS default print processor subroutines to perform traditional print processing. This arrangement avoids the printer manufacturer having to duplicate and maintain functionality present in the driver and print processor maintained by the OS or custom replacement print processor vendor.

27 Claims, 7 Drawing Sheets

U.S. PATENT DOCUMENTS

| | | |
|---|---|---|
| 7,106,472 B2 * | 9/2006 | Gomez et al. ............. 358/1.15 |
| 2002/0062404 A1 * | 5/2002 | Ecob et al. ................. 709/321 |
| 2002/0101600 A1 * | 8/2002 | Sabbagh et al. ........... 358/1.13 |
| 2003/0184782 A1 | 10/2003 | Perkins et al. |
| 2003/0184784 A1 * | 10/2003 | Ferlitsch ................... 358/1.13 |
| 2003/0200361 A1 * | 10/2003 | Dogra et al. ................... 710/8 |
| 2003/0200427 A1 * | 10/2003 | Kemp et al. ................... 713/1 |
| 2004/0111597 A1 * | 6/2004 | Rothman et al. ............... 713/1 |
| 2005/0159926 A1 * | 7/2005 | Saito .......................... 702/186 |
| 2006/0017948 A1 * | 1/2006 | Levin et al. ................ 358/1.13 |
| 2006/0176499 A1 * | 8/2006 | Shintoku .................... 358/1.13 |
| 2006/0221372 A1 * | 10/2006 | Onishi et al. .............. 358/1.13 |
| 2006/0224876 A1 * | 10/2006 | Kato ............................. 713/1 |
| 2006/0230261 A1 * | 10/2006 | Yoshimura et al. ........... 713/1 |

* cited by examiner

PRINTER DRIVER CUSTOMIZATION USING INCREMENTAL CUSTOM PRINT PROCESSOR

FIELD OF THE INVENTION

The present invention relates generally to printing, and more particularly to printer drivers, spoolers, print processors, and related processes.

BACKGROUND OF THE INVENTION

In many computer operating systems, printing tasks are divided between several well-known processes or functions. FIG. 1 shows the relationship between these processes for an exemplary POSTSCRIPT driver 22 in a MICROSOFT Windows-type operating system (OS) environment. A printer driver 22 accepts operating-system-specific printing instructions, from applications (or, more generally, other processes) 20, and converts these instructions to a rendered format or to a metafile (i.e., the driver journals the printing instructions for delayed background rendering). Rendered/journaled print data is combined with other information (e.g., printer job language commands) to form a print job. The print job is spooled to a spooler 24, which implements a queue for the print data from driver 22, and therefore allows the driver to generate multiple print jobs while a first job is pending on the printer. Either immediately or delayed, the spooler despools the print job to a print processor 26. Print processor 26 performs different functions depending on the operating system. Generally, if the print data is journaled (e.g., Extended MetaFile or EMF) data, print processor 26 passes the journaled data back through the printer driver 22. Otherwise, in the case of rendered print data, print processor 26 despools the print data to a port manager 28 that actually performs data communication with the printer.

Printer drivers are generally printer specific and operating-system specific, as these drivers must convert the operating system printing instructions to a Page Description Language (PDL) or raster format understandable by the particular printer they are supporting, and may encapsulate that data in a specific Printer Job Language (PJL) to implement other printer functions (e.g., stapling, sorting). Hewlett Packard PCL (Printer Control Language) and Adobe PS (POSTSCRIPT) are two prevalent formats for printer communications, although different printers may provide different levels of support for these formats, and/or additional features not directly supported by these standard formats.

In FIG. 1, POSTSCRIPT driver 22 is described as a monolithic PS driver, meaning that this driver is written to implement PS functionality specifically for the printer (or group of printers with common features) that this driver supports. A monolithic driver would include, e.g., a printer-specific menu to allow a user to control the available print options, a MICROSOFT OS Device Driver Interface (OS-DDI) to process printing instructions received from applications, a renderer to generate PS print data specific to the printer, and a PJL generator to actuate the printer's special features.

A monolithic driver requires a one-time cost to design and develop the driver from scratch—a cost that may be significant. Rivaling this cost is the additional cost to test and debug the driver, and then package it. The driver must then be maintained. Although historically many printer drivers were implemented this way, monolithic drivers are generally no longer cost effective given the regular introduction of new operating systems and printer models with different feature sets, and the complexity of both. Each supported operating system requires its own test and debug procedure, each time an incremental modification is made to the existing driver. Thus the ongoing costs to a printer manufacturer from such an approach are significant.

FIG. 2 shows an alternate approach that saves some development costs. Source code for a generic PS driver 34 is purchased from a vendor (e.g., Adobe POSTSCRIPT 3.0). The printer manufacturer then adds customizations 36 to the driver source code that are appropriate for the specific printer to be supported, to create a driver 32. The generic driver vendor generally charges a royalty for each copy of the driver distributed. Thus although this approach saves some money upfront, it requires that one learn the source code for the existing driver, integrate patches and updates from the vendor into the driver, and maintain the customizations. Further, this approach does not decrease test, debug, and packaging costs or alleviate costs associated with revisions and updates, and adds an additional fixed cost to every printer sold.

Both APPLE and MICROSOFT supply configurable PS printer drivers free of charge, as part of their operating systems, which read PPD (POSTSCRIPT Printer Definition) files (use of PPD files is not limited to these operating system families, however). Taking the MICROSOFT driver as an example (see FIG. 3), a printer manufacturer can use the MICROSOFT OS base PS driver 42 by describing and storing the specifics of the manufacturer's printer in PPD file 40. The base PS driver 42 reads the PPD file when it is called upon to render a print job for the corresponding printer.

The PPD is a text file, with each non-comment line having a *feature:value format such as: *DefaultFont: Courier (setting the printer's default font); *ImageableArea A3/A3: "14 14 828 1178" (setting the printable area for A3 paper); *DefaultResolution: 600 dpi (printer resolution). Various toolkits are available to generate a PPD file from a menu-driven interface.

The PPD approach has some appeal—it does not require that a printer driver be written from scratch or maintained, it allows for customization, it is generally portable, and does not require royalties. Also, although each time the PPD is changed it must be tested, in general it need not be tested for each operating system.

The PPD approach also has a few drawbacks. Although a rich set of PPD predefined features and options are available, this set is nevertheless limited and would not include new features that a manufacturer might develop. The manufacturer cannot add such features to the PPD, and cannot modify the corresponding "free" driver since no source code is supplied. Thus with a PPD PS driver there is no way to configure the driver to take advantage of newly discovered features that might set a manufacturer apart from the competition.

SUMMARY OF THE INVENTION

It is recognized herein that it would be desirable to a printer manufacturer if there were a way to enjoy the advantages of a PPD driver, and yet still be able to offer non-PPD features on a printer. One method that the present inventor has considered is replacing the OS default print processor with a custom print processor that acts like the default print processor, but also implements custom printer features that cannot be implemented by PPD—in essence moving part of the operability of the driver to the print processor. Although this can work, it has several drawbacks. The default print processor is not generally portable between different operating systems, and thus a custom print processor is required for each supported OS. For example, the Windows NT default print processor reads EMF data as a single file per job, whereas the Windows 98 default print processor reads EMF data as an index file and separate data file for each page. Also, the Windows 2000 default print processor includes some features not found in Windows NT and 98, such as various sheet assembly emulation options. And, if a third-party custom replacement print processor is already installed to perform some required printing function, such as job accounting, the user would likely not want that print processor replaced. Thus although some of the difficulties present with a monolithic driver are avoided in the custom print processor approach, some are just replaced with similar difficulties for what is now a monolithic custom print processor.

A custom replacement print processor is assumed to conform to the system print processor in both interface and functionality. In contrast to the custom replacement print processor approach, some embodiments described herein present an "incremental" approach that can allow both an existing printer driver and the OS-supplied default print processor (or other third-party custom replacement print processor) to be retained. Briefly, a custom print processor is placed in the data path between the print spooler and the default or "system" print processor. The custom print processor appears to the print spooler as the print processor. In actuality, the custom print processor merely accepts subroutine call arguments from the spooler and passes these arguments through to the default print processor subroutine calls. But in addition to this pass-through functionality, however, the custom print processor can perform a custom action in one or more of its subroutine calls before passing those calls through to the default print processor. Thus although "custom", the print processor implements little more than the custom features, and relies on the default print processor to implement the rest. This custom print processor can therefore remain fairly simple and portable across multiple operating systems, since it need only comprehend and retain the argument structure for a print processor subroutine call on each platform.

BRIEF DESCRIPTION OF THE DRAWING

The invention may be best understood by reading the disclosure with reference to the drawing, wherein.

DETAILED DESCRIPTION OF THE EMBODIMENTS

The following embodiments are described in the context of various MICROSOFT Windows operating systems. Although exemplary, these embodiments are not intended to be limiting, as the concepts illustrated can be applied in other vendors' operating systems, as well as in MICROSOFT Windows operating systems that are not specifically addressed.

Figure 1:
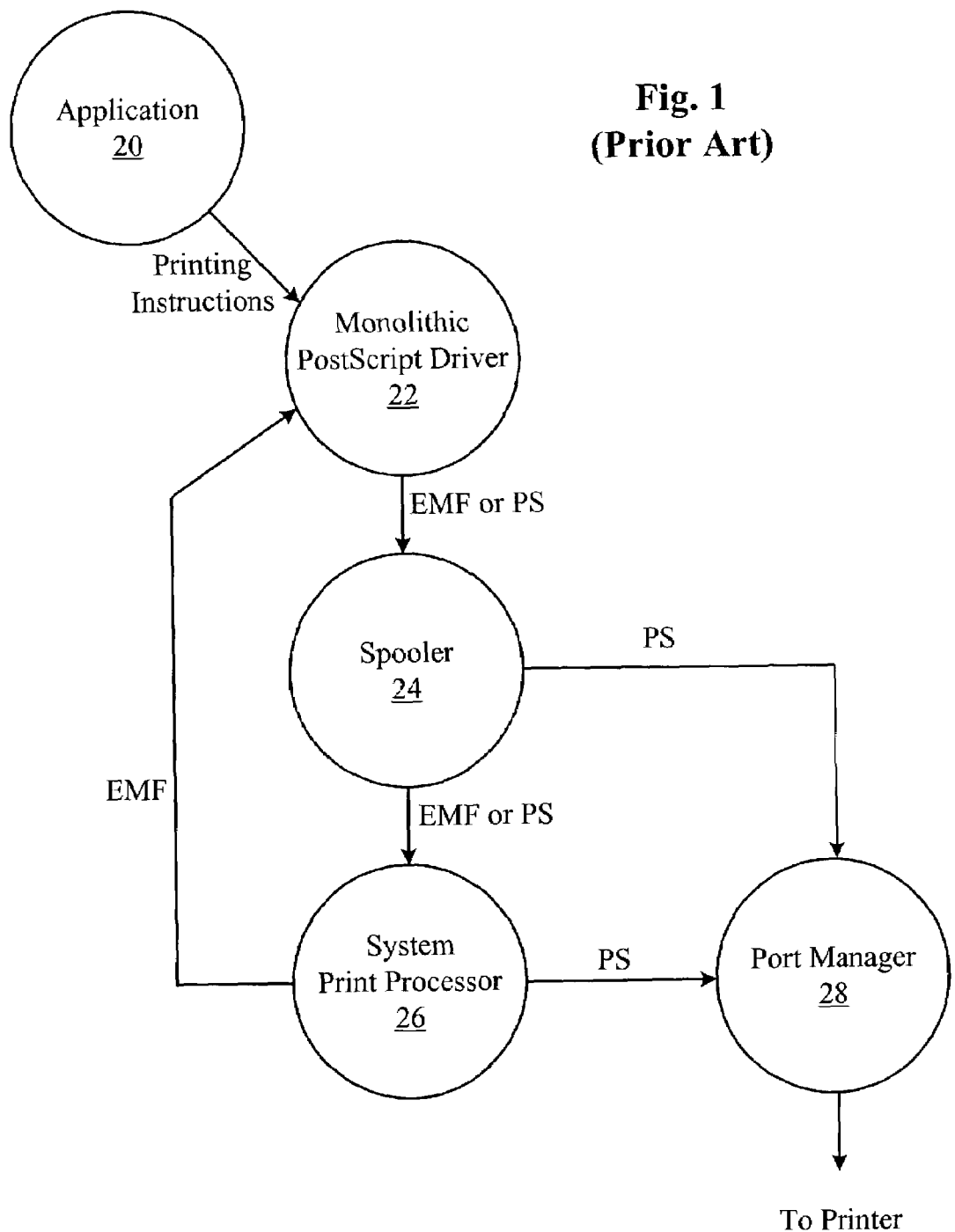
FIGS. 1, 2, and 3 illustrate prior art Windows OS print environments for, respectively, a monolithic PS driver, a customized generic PS driver, and a PPD PS driver.
Figure 2:
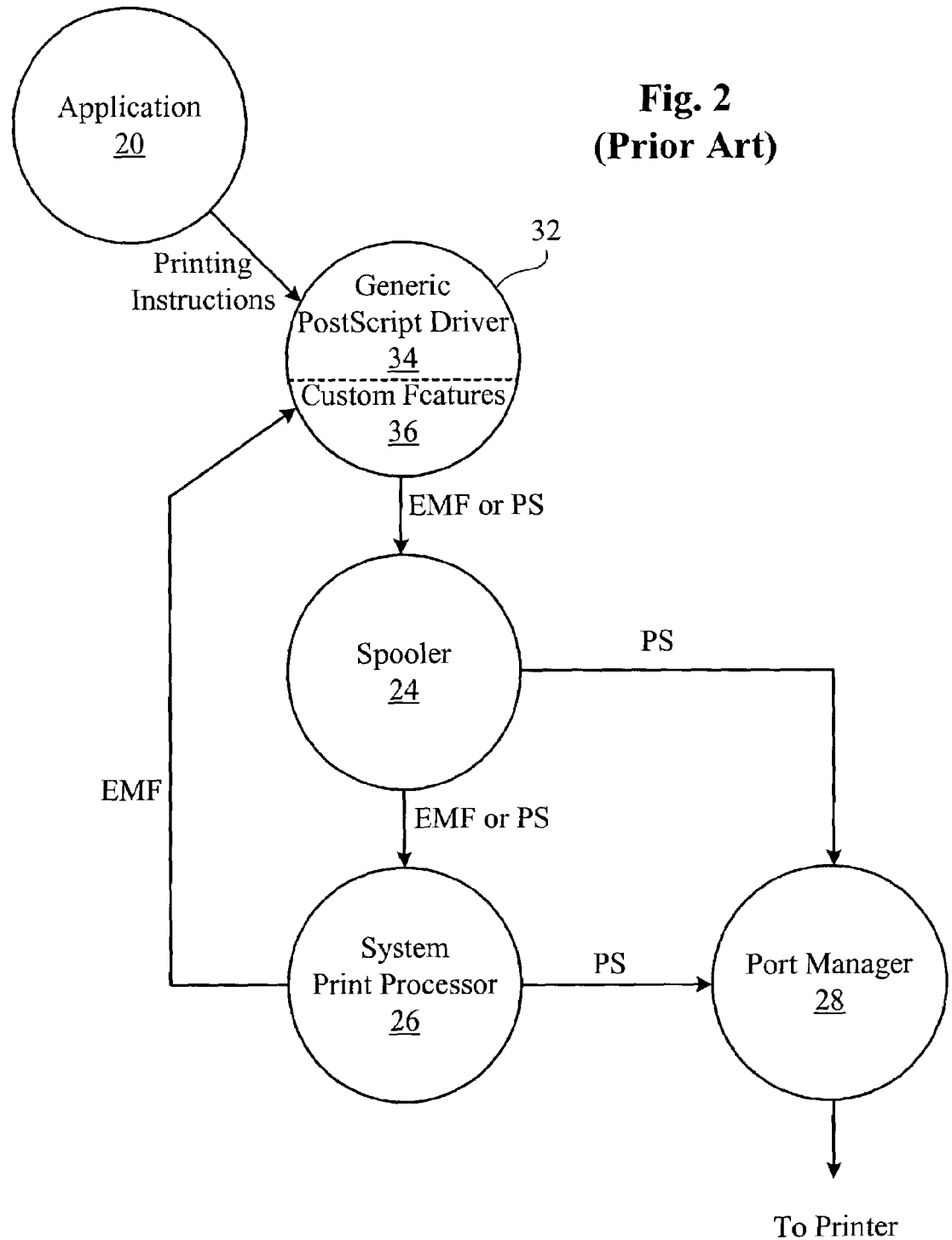
Figure 3:
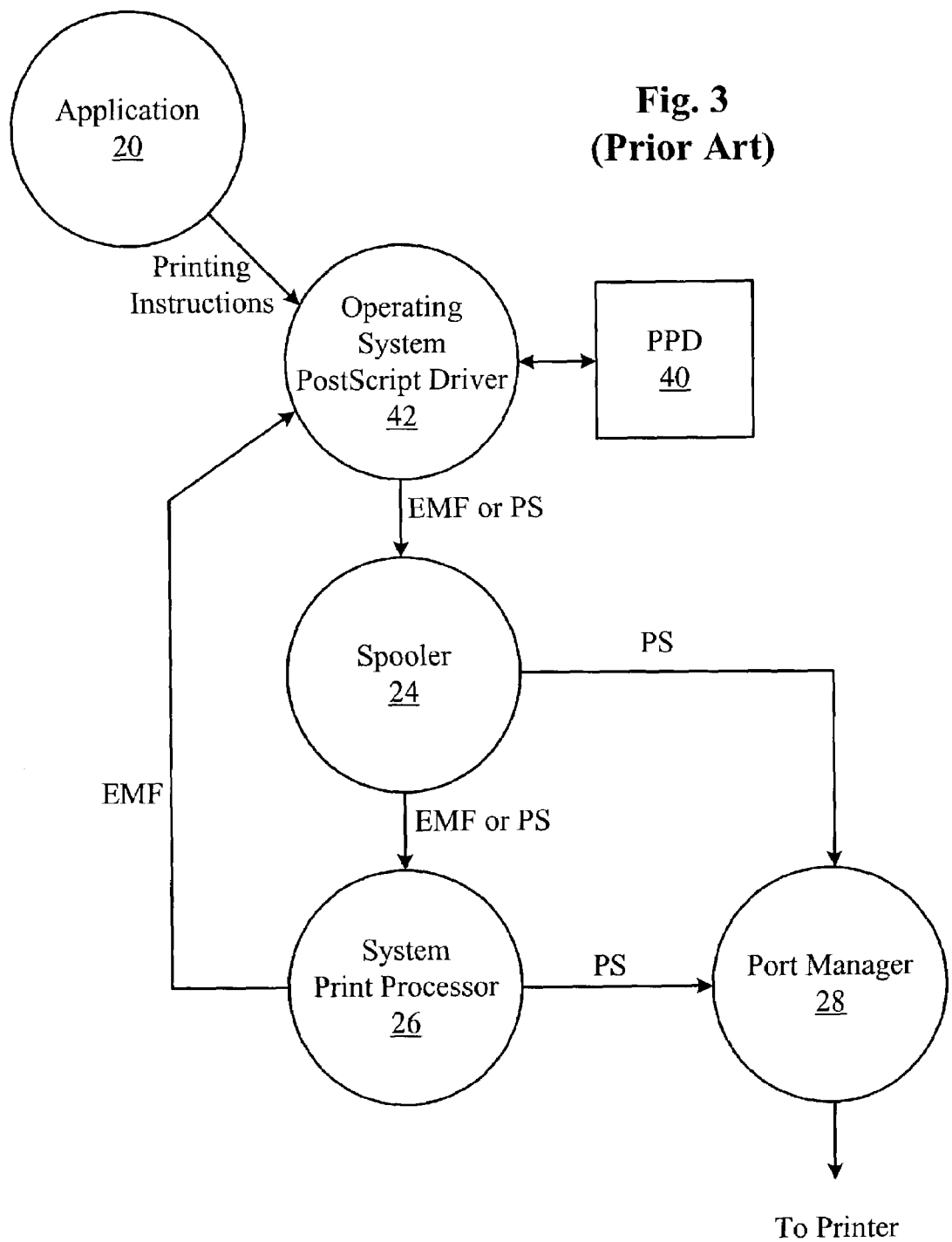
Figure 4:
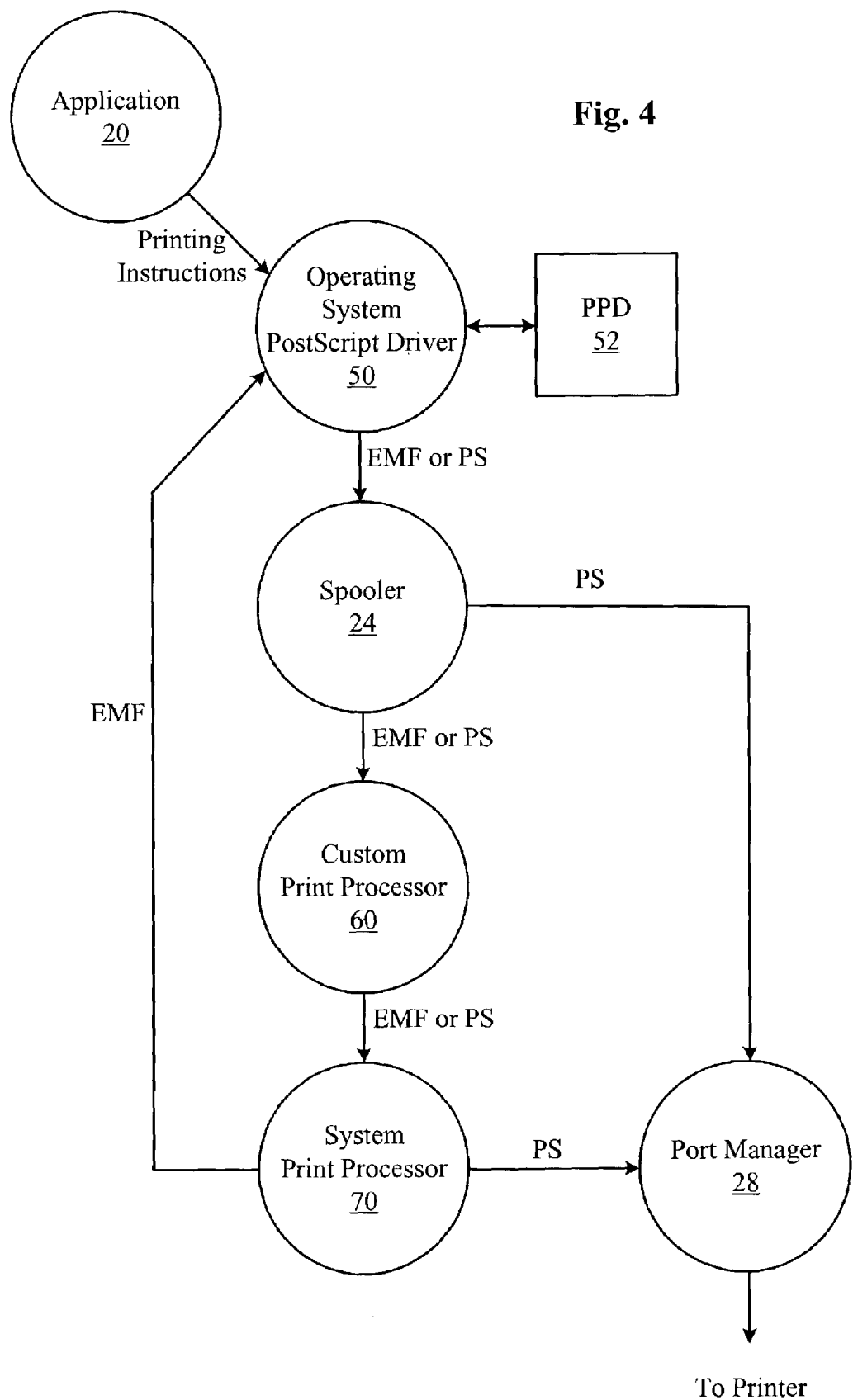
FIG. 4 shows a Windows OS print environment according to an embodiment of the invention, using a PPD PS driver and a custom print processor inserted between the spooler and system print processor.

FIG. 4 shows the general print data flow for a first embodiment of the invention. A PS driver is constructed using the OS built-in base PS driver 50 and a PPD 52. Preferably, PPD 52 includes whatever printer features and options are specifiable by PPD (as will be discussed below, this may include features that can be specified by PPD but are not recognizable by the particular printer—these serve as instructions to a custom print processor to emulate the feature). Once constructed, this PS driver is called whenever an application or process 20 desired to print to the corresponding printer.

Once, rendered or journaled, print data is spooled by base PS driver 50 to spooler 24, as is conventional. By, e.g., one of the methods to be illustrated below, the spooler is configured to pass print job data to custom print processor 60. Custom print processor 60 performs any custom actions that are appropriate, and then passes the print job data to the system print processor 70. System print processor 70 continues processing, as is conventional and as it would if called directly from spooler 24.

As an aid in this illustration, it is instructive to examine how spooler 24 and system print processor 70 interact in the absence of custom print processor 60. In a MICROSOFT OS, the default print processor subroutines are located in a Dynamic-Link Library (DLL), named winprint.dll. As will be recognized by those skilled in the art, a DLL contains binary instructions that can be linked to a calling program at runtime instead of at compile time, using dynamic linking.

Figure 5:
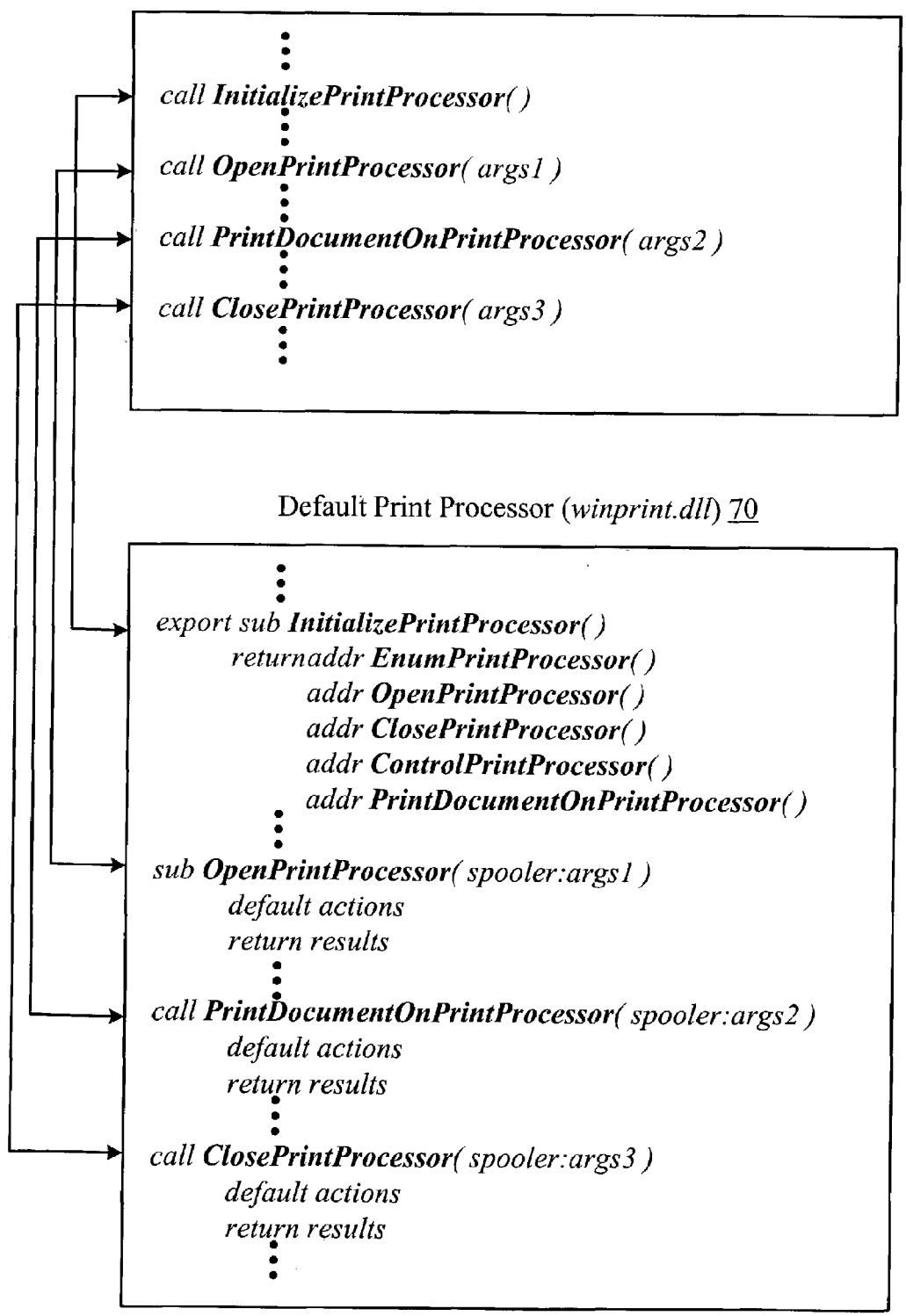
FIG. 5 shows the prior art relationship between a spooler and a system print processor dynamic link library.

The default print processor DLL includes several external-referenced subroutines that are normally callable by the spooler, of the form <Entry>PrintProcessor(spooler:args), where Entry is selected from the group {Enum, Open, Close, Control, PrintDocumentOn}, and "spooler:args" represents the arguments expected from the spooler with that particular call. FIG. 5 illustrates the contents of winprint.dll conceptually (the actual file is of course a binary file), showing each of these subroutines with a corresponding entry point.

In addition to these external-referenced subroutines, the default print processor DLL includes an exported function InitializePrintProcessor( ). After an operating system reboot, the first time a printer driver having a correspondence to winprint.dll is invoked, winprint.dll is dynamically loaded into the spooler. After loading winprint.dll, the spooler uses the OS function GetProcAddress( ) to discover the address of InitializePrintProcessor( ). The spooler calls InitializePrintProcessor( ), which returns a data structure containing the addresses of the remaining external-referenced, but not exported, functions in the print processor (the <Entry>PrintProcessor( ) functions described above). The spooler can then call the <Entry>PrintProcessor( ) functions as they are needed.

Figure 6:
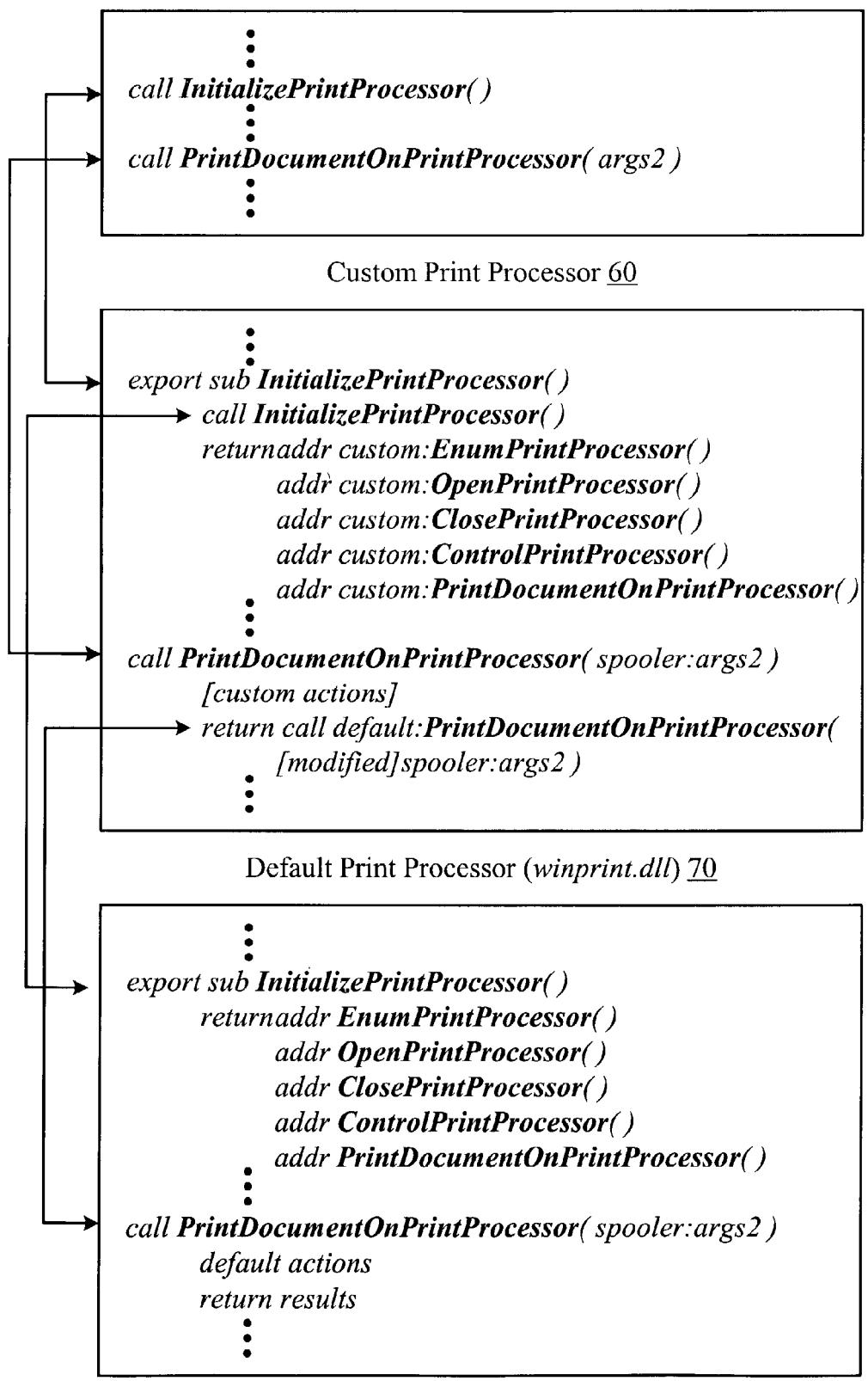
FIGS. 6 and 7 illustrate relationships between a spooler, a custom print processor, and a system print processor for some embodiments of the invention.

In the present embodiment, a custom print processor DLL is dynamically linked to the spooler instead of the winprint.dll. As shown in FIG. 6, the custom print processor DLL contains external-referenced subroutine entry points, custom:<Entry>PrintProcessor( ), corresponding in type and arguments to the winprint.dll entry points, and an exported function InitializePrintProcessor( ).

When the custom print processor DLL is first loaded, it also loads winprint.dll. When the custom function InitializePrintProcessor( ) is called by the spooler, it calls in turn the winprint.dll function InitializePrintProcessor( ) to discover the addresses for the winprint.dll functions <Entry>PrintProcessor( ). The custom print processor then returns, to the spooler, a data structure indicating the addresses of the custom:<Entry>PrintProcessor( ) functions.

Referring back to FIG. 6, a call to one of the print processor entry points is illustrated. The spooler performs a subroutine call to custom:<Entry>PrintProcessor(args) using the corresponding address that was returned during the InitializePrintProcessor( ) call. The syntax of args depends on which subroutine is called.

The custom print processor function custom:<Entry>PrintProcessor(spooler:args) performs any custom actions that are appropriate (some examples are included further along in this description). The custom actions may, however, as one result modify the arguments received from the spooler. After taking the custom actions, the subroutine custom:<Entry>PrintProcessor( ) calls its corresponding default print processor function <Entry>PrintProcessor ([modified]spooler:args) from winprint.dll, with the (possibly modified) arguments passed in by the spooler. The default print processor function performs whatever actions are conventional for the print processor to perform in that operating system, and returns the results to the custom print processor. The custom print processor returns these default results to the spooler. If the results of the custom print processor actions require, the default results may be merged or combined with the custom results as appropriate.

From this example, it can be appreciated that the functionality embedded in the custom print processor can be relatively small and focused almost exclusively on implementing the custom features. By depending on the default print processor to do the work normally expected of a print processor, the custom print processor need not replicate that functionality or concern itself greatly with the idiosyncrasies of each platform (unless, of course, those idiosyncrasies are implicated in the custom features). As such, test and debug procedures become relatively straightforward and development and maintenance costs are reduced.

There are several different broad categories of custom actions that may be implemented in the custom print processor. For a given print job, none, one, some, or all of these categories of actions may be performed.

The first category of custom actions includes the set of actions that allow a user to actuate a non-PPD feature or option. For instance, after a print job is despooled to the custom print processor (e.g., in the custom:PrintDocumentOnPrintProcessor( ) subroutine), a User Interface can be displayed that allows a user to select a custom feature. Exemplary features could include a pool-printing feature (the user selects this feature to allow the print processor to select a printer from a group of printers, e.g., based on availability and/or a best capability match), a job-splitting feature that splits a print job into several sub-jobs and distributes these jobs to different printers, a sheet assembly or document-finishing feature that is not available in the PPD, etc. Also included in the custom action could be a pop-up notification that a feature, such as a cluster-printing feature, has directed the print job to a specific printer or printers.

The second and third categories of custom actions are those that modify the print data stream, e.g., to add, delete, or modify print job language commands (category two) or modify the rendered data by adding or modifying POSTSCRIPT directives (category three). In a MICROSOFT OS the print data stream is not part of the Application Binary Interface (ABI) of the print processor, but is located in a spool data file associated with the print job. Thus category two and three custom actions require that the custom print processor locate and modify the print job spool data file before the default print processor PrintDocumentOnPrintProcessor( ) function is called. The spool file can be located using the print job ID ("jobID") passed from the spooler to the custom print processor OpenPrintProcessor( ) call as part of the Document Data argument. Using jobID, the custom print processor can find the spool file at, e.g., C:\windows\system\spool\<jobID>.spl (Windows 95/98/Me) or C:\windows\system32\spool\printers\<jobID>.spl (Windows NT/2000). Once this file is located, the custom print processor can open the spool data file for read/write and modify it in place, or read the spool data file, make modifications to the copy, and then replace the spool data file with a new spool data file. For instance, a PJL command could be inserted in the spool file to activate a binding option that cannot be specified in the PPD. A sheet assembly option, not available through the PPD, can be specified in the POSTSCRIPT data. Where a job is split between two printers, the spool file could be duplicated and one copy sent to each printer. In each copy, the number of copies command would be located and modified to reflect the number of copies actually printed by that copier.

The last category of custom actions includes those that modify the arguments received from the spooler before passing those arguments to the default print processor. For instance, if the custom action redirects the print job to a different printer, the spooler arguments can be modified accordingly to force this redirection in the default print processor.

Note that in order to fully implement a given custom feature, custom actions in two or more of these categories may be required. It is also possible that a custom action could work in conjunction with the PPD to emulate a PPD-specifiable function that the print device itself does not support. For instance, a given sheet assembly option can be indicated as supported in the PPD, even though the print device does not support this option directly. When the user selects this option, the custom print processor detects the selection directive, removes the directive from the spool file, and rearranges the data in the spool file to match the option.

Figure 7:
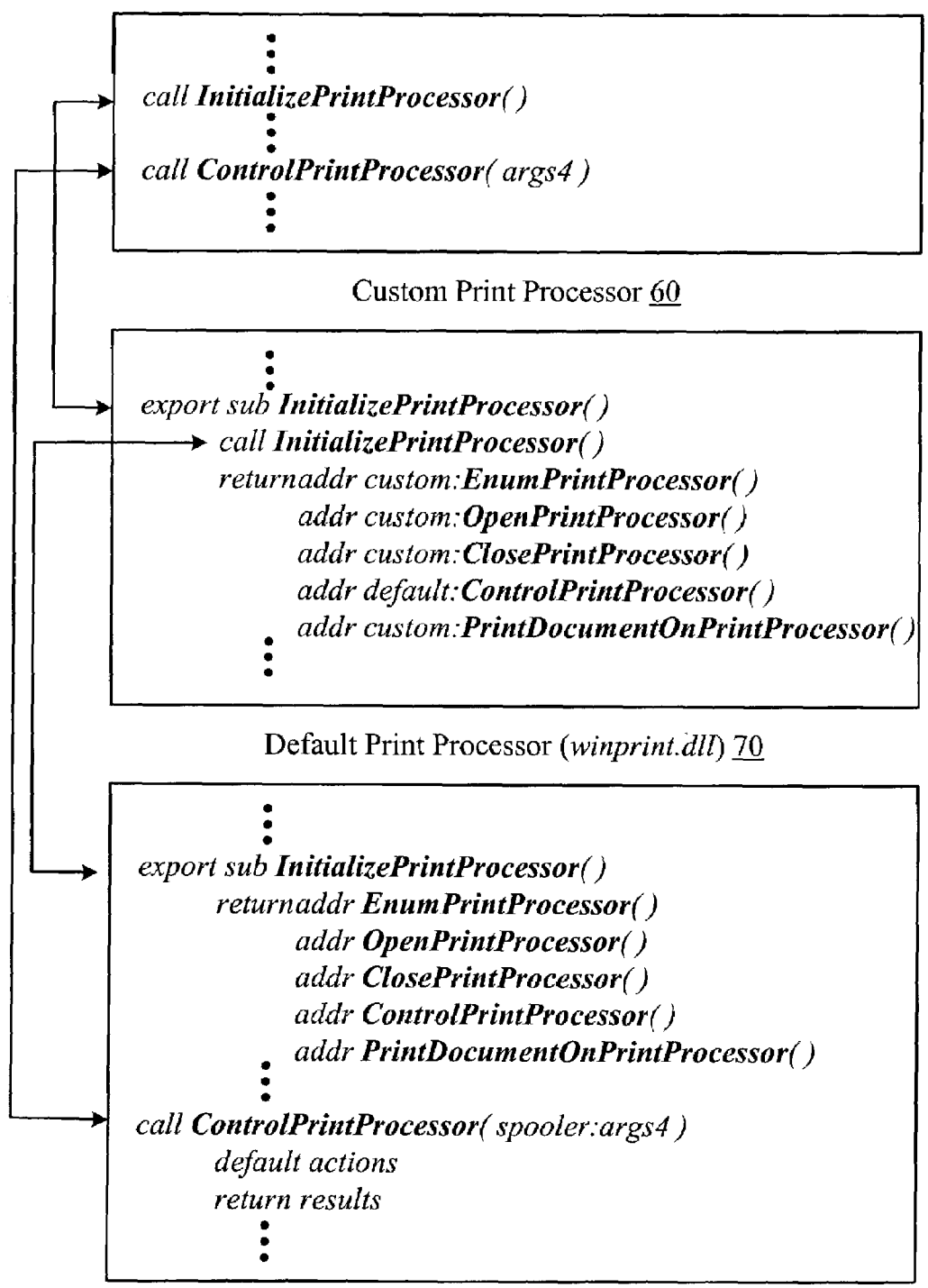

The preceding example assumes that some custom action (or some configuration needed for later custom actions) may result from each spooler call to a print processor function. It is conceivable that for a given print processor function the custom print processor does nothing more than pass the arguments through in a call to the default print processor, and return the result of the default call to the spooler. In such a case, that particular custom print processor function can optionally be removed from the library. As illustrated in FIG. 7 for the ControlPrintProcessor( ) function, the custom InitializePrintProcessor( ) function merely returns the address of the default print processor ControlPrintProcessor( ) function in the data structure. When the spooler subsequently calls ControlPrintProcessor( ), the custom print processor is bypassed for that call.

In accordance with the preceding embodiments, several new methods for installing a POSTSCRIPT printer on a computer operating system are also contemplated. A PPD that defines those printer features supportable by the base PS driver is installed. The custom print processor, including the custom actions, is installed in the proper directory (e.g., C:\windows\system for Windows 95/98/Me, or C:\windows\system32\spool\prtprocs\w32x86 for Windows NT/2000/XP). Then the operating system is configured to call the custom print processor instead of the default print processor. This step can be accomplished in several ways. First, the information (.inf) file corresponding to the PPD can be modified directly. This involves setting the PrintProcessor field to specify the library containing the custom print processor. Second, in some operating systems there is a Print Processor setting in the printer driver's system properties (located at Properties->Advanced->Print Processor on Windows NT/2000/XP). This setting can be set to the library containing the custom print processor. Third, a copy of the spooler executable file can be modified directly in some instances such that at run time it dynamically loads the custom print processor instead of the default print processor. This involves locating the relocation entry (although located in a binary file, these entries appear in a table of ASCII strings) for the winprint.dll InitializePrintProcessor( ) function, and modifying it to bind instead to the initialize function in the custom print processor DLL. Depending on the operating system, other methods may be available, but are not discussed in detail herein.

Those skilled in the art recognize the various media capable of holding the binary custom print processor library functions and PPD definitions, including but not limited to optical and magnetic disks, and static or dynamic solid-state memory devices, any of which may be local, networked, fixed or removable, and understand that at distribution, after installation, and at run-time the functions and definitions can exist in various places on these media.

Although POSTSCRIPT has been used as an exemplary PDL in the preceding embodiments, an incremental custom print processor as described can be equally applied to other rendering formats, whether they be another PDL or another format entirely. In general, the printer manufacturer knows the format its printer expects, and thus can write the incremental custom print processor to read and modify print data in that format. The printer driver need not be a PPD driver, and could even be a driver supplied by the printer manufacturer.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Although a "default" or "system" print processor is generally a print processor supplied with the OS, the default or system print processor can also be a custom replacement print processor. "Modifying" print job data or arguments can include in-place alteration, additions, or deletions, or replacement with substitute data or arguments. No distinction is drawn herein between the terms "subroutine", "function", and "entry point". Although the embodiments described herein implement the custom print processor as a single DLL, the functionality could of course be distributed among multiple DLLs, and/or in some operating systems the custom print processor could be a separately executable program. Note that although the custom print processor is sometimes described as associated with a "printer" of a given type, that "printer" can in some instances be a cluster of printers, which need not all be of the same type, administered by the custom print processor. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of configuring a computer's operating system to process print jobs for a printer, the method comprising:
    installing a primer definition file to define printer features supported by a generic printer driver;
    installing a custom print processor that defines and implements custom printer features not supported by the generic printer driver but that are supported by the printer, the custom print processor linking to a default print processor to perform print processing other than the custom primer features;
    configuring a print spooler to pass spooler argument data that represents one or more jobs to the custom print processor;
    configuring the custom printer processor to modify the spooler argument data when one of the custom printer features is selected, and to pass the modified spooler argument data to the default print processor for performing print processing other than the custom printer features; and
    configuring the custom printer processor to pass-through the spooler argument data to the default print processor without making modifications when the custom printer features are not selected;
    wherein the operating system is configured to process the print jobs using the custom print processor responsive to a user request when the user request selects the custom print features.

2. The method of claim 1, wherein the printer accepts the print jobs in a page description language, the method further comprising supplying a printer definition for the printer to a generic page description language printer driver that supplies print data to the print spooler.

3. The method of claim 2, further comprising, for at least one of the custom printer features, configuring the custom print processor to display that custom printer feature to the user as a selectable element of a graphical user interface for allowing the user to indicate the selected custom printer features to be processed by the custom printer processor.

4. The method of claim 1, wherein configuring the custom printer processor to modify the spooler argument data when one of the custom printer features is selected comprises configuring the custom print processor to modify a section of the print jobs containing print job command language.

5. The method of claim 1, further comprising configuring the system print processor to only process non-custom print job aspects that are not included in the printer definition file.

6. The method of claim 1, further comprising binding the print spooler to the custom print processor.

7. A custom print processor dynamic-link library located on a computer readable medium, the custom print processor dynamic-link library comprising:
    a set of external-referenced custom print processor subroutines that conform to the calling syntax of a set of external-referenced default print processor subroutines in a default print processor dynamic-link library, each custom print processor subroutine in the set including a call to a corresponding default print processor subroutine entry point, at least one of the custom print processor subroutines further comprising a custom action to be performed prior to calling the corresponding default print processor subroutine; and
    an initialization subroutine that loads the default print processor dynamic-link library and retrieves the default print processor subroutine entry points, the initialization subroutine providing a set of print processor subroutines entry points to a calling process;

wherein the set of external-referenced custom print processor subroutines comprises one custom print processor subroutine entry point for each default print processor subroutine entry point.

8. The custom print processor dynamic-link library of claim 7, the custom action comprising at least one action selected from the group of actions comprising modifying print job command language, modifying printing data, and modifying spooler argument data.

9. A custom print processor dynamic-link library located on a computer readable medium, the custom print processor dynamic-link library comprising:
a set of external-referenced custom print processor subroutines that conform to the calling syntax of a set of external-referenced default print processor subroutines in a default print processor dynamic-link library, each custom print processor subroutine in the set including a call to a corresponding default print processor subroutine entry point, at least one of the custom print processor subroutines further comprising a custom action to be performed prior to calling the corresponding default print processor subroutine; and
an initialization subroutine that loads the default print processor dynamic-link library and retrieves the default print processor subroutine entry points, the initialization subroutine providing a set of print processor subroutines entry points to a calling process;
wherein the set of external-referenced custom print processor subroutines includes one subroutine entry point for a subset of the default print processor subroutine entry points, the entry points supplied to a calling process by the initialization subroutine including default print processor subroutine entry points for those entry points not having a corresponding custom print processor subroutine entry point.

10. The custom print processor dynamic-link library of claim 9, the custom action comprising a user interface display action, the user interface allowing a user to select from a set of custom print features not available with a corresponding printer driver.

11. The custom print processor dynamic-link library of claim 10, the custom action further comprising, depending on the custom print features selected by a user, at least one action selected from the group of actions comprising modifying print job command language, modifying printing data, and modifying spooler argument data.

12. A method of installing a PostScript printer on a computer operating system, the method comprising:
installing a PostScript Printer Definition (PPD) to define standard print routines and standard operating attributes for the PostScript printer;
comparing the PPD to a feature set of the PostScript printer to identify custom print features that the PostScript printer is configured to perform but which are not supported by the PPD;
installing a custom print processor that defines and implements the identified custom printer features not supported by the generic PostScript printer driver, the custom print processor dynamically linking to a default print processor to perform print processing other than the identified custom printer features; and
configuring the operating system to call the custom print processor instead of the default print processor for print jobs spooled for the printer;
when a user requests a custom print job, wherein the installed PostScript printer and the operating system are configured to print a user requested print job using the custom print processor responsive to the user request.

13. The method of claim 12, wherein configuring the operating system to call the custom print processor comprises setting an information file to indicate that the custom print processor is the print processor to be used for the printer.

14. The method of claim 12, wherein configuring the operating system to call the custom print processor comprises setting an operating system property.

15. The method of claim 12, wherein configuring the operating system to call the custom print processor comprises modifying a spooler relocation table entry to bind the spooler to the custom print processor.

16. The method of claim 12, further comprising configuring the custom print processor to modify spooler argument data before passing the spooler argument data to the default print processor.

17. An apparatus comprising a computer-readable medium containing instructions and definitions that, when executed by one or more processors, cause the one or more processors to:
identify a printer definition file listing a plurality of generic printer functions operable by a first printer type;
identify at least one non-generic printing function operable by the first printer type, the non-generic printing function being different than all the generic printing functions included in the printer definition file;
configure a print spooler to pass a print job for the first printer type to a custom print processor;
configure the custom print processor to modify spooler argument data received from the printer spooler to process the at least one non-generic printing function when a custom print action is requested over an input;
configure the custom print processor to send the modified spooler argument data to a system print processor for processing at least one of the generic printing functions;
configure the custom print processor to pass-through the spooler argument data received from the printer spooler without modification when the custom print action is not requested;
configure the system print processor to process at least one of the generic printing functions in response to receiving the modified spooler argument data or the unmodified spooler argument data from the custom print processor.

18. The apparatus of claim 17 wherein the at least one of the generic printing functions sets a default font for the first printer type.

19. The apparatus of claim 17 wherein the at least one non-generic printing function splits the print job into a plurality of sub-jobs.

20. The apparatus of claim 19 wherein the at least one non-generic printing function provides a pop-up notification that a cluster-printing feature has directed the print job to a second printer type.

21. The apparatus of claim 17 wherein the processors are operable to modify a spooler relocation table entry to bind the print spooler to the custom print processor.

22. A method, comprising:
identifying a printer description file listing a generic printer arguments for a printer type and attributes for the default printer type;
identifying at least one non-generic printing argument operable with the printer type, the at least one non-generic printing argument providing a non-generic printing function for the printer type, the non-generic printing function being independent from all the generic printing functions provided by the generic printing arguments included in the printer description file;

configuring a print spooler to pass a print job for the printer type to a custom print processor; and configuring the custom print processor to accept the print job from the print spooler, process the at least one non-generic printing argument, and pass the print job to a system print processor for processing at least one of the generic printing arguments;

wherein the print spooler is configured to process a user requested print job using the custom print processor responsive to a user request that identifies at least one of the non-generic printing arguments.

23. The method of claim 22 wherein the custom print processor does not process any of the generic printing arguments included in the printer description file.

24. The method of claim 23 wherein the system print processor only processes the generic printing arguments without processing any non-generic printing functions.

25. The method of claim 24 wherein the printer description file is a PostScript Printer Definition (PPD) file.

26. The method of claim 24 wherein the printer description file identifies a default font setting for the printer type and a default printer resolution for the printer type.

27. The method of claim 22, further comprising configuring the custom print processor to modify spooler argument data before passing the spooler argument data to the system print processor.

* * * * *

UNITED STATES PATENT AND TRADEMARK OFFICE
CERTIFICATE OF CORRECTION

PATENT NO.       : 7,256,901 B2                                    Page 1 of 1
APPLICATION NO.  : 10/269378
DATED            : August 14, 2007
INVENTOR(S)      : Andrew R. Ferlitsch It is certified that error appears in the above-identified patent and that said Letters Patent is hereby corrected as shown below:

At column 8, line 13, please replace "more jobs" with --more print jobs--

Signed and Sealed this

Seventeenth Day of February, 2009

JOHN DOLL
*Acting Director of the United States Patent and Trademark Office*